(12) United States Patent
Bastien

(10) Patent No.: US 12,204,493 B2
(45) Date of Patent: Jan. 21, 2025

(54) MOBILE COMPUTING NETWORK QUERIED CONTENT CAPTURE

(71) Applicant: Woven by Toyota, Inc., Tokyo (JP)

(72) Inventor: Jean-François Bastien, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 0 days.

(21) Appl. No.: 18/340,040

(22) Filed: Jun. 23, 2023

(65) Prior Publication Data

US 2024/0427731 A1  Dec. 26, 2024

(51) Int. Cl.
*G06F 16/11* (2019.01)
(52) U.S. Cl.
CPC .................................. *G06F 16/125* (2019.01)
(58) Field of Classification Search
None
See application file for complete search history.

(56) References Cited

U.S. PATENT DOCUMENTS

| | | |
|---|---|---|
| 9,509,803 B2 | 11/2016 | Soon-Shiong |
| 9,940,403 B2 | 4/2018 | Chow et al. |
| 10,257,304 B2 * | 4/2019 | Lavi .................... H04L 67/5683 |
| 2020/0027354 A1 * | 1/2020 | Goldman ........ G06Q 10/063118 |
| 2022/0043459 A1 * | 2/2022 | Ayers ..................... G08G 1/202 |
| 2023/0194277 A1 * | 6/2023 | Kakosyan ............... H04L 67/30 |
| | | 701/23 |

OTHER PUBLICATIONS

Yeo, Hui-Shyong, et al., "Leveraging client-side storage Techniques for Enhanced use of multiple consumer cloud storage Services on resource-constrained mobile devices", Journal of Network and Computer Applications 43 (2014), pp. 142-156. (Year: 2014).*

* cited by examiner

*Primary Examiner* — Scott A. Waldron
(74) *Attorney, Agent, or Firm* — HAUPTMAN HAM, LLP

(57) ABSTRACT

Mobile computing network queried content capture is performed by receiving, from a server, a task executable by a mobile computing network, and a retention policy, executing the task using the mobile computing network to capture target content, assigning, to a first instance of captured target content, a probability of reducing based on the retention policy, reducing, in response to an amount of available storage becoming equal to or lower than a threshold amount, at least one of the first instance and a portion of other stored data based on the probability of reducing, and transmitting, in response to connecting to a wide area network, each instance of captured target content.

20 Claims, 9 Drawing Sheets

MOBILE COMPUTING NETWORK QUERIED CONTENT CAPTURE

BACKGROUND

Distributed databases are usually queried by duplicating the database and directing all queries to the duplicate rather than the original. As connectivity between different products increases, software developers seek to develop new applications for allowing users to customize experiences with different products. In order to develop the applications, software developers rely on data structures within the product in order to develop an application which operates reliably on the product. In some instances, application program interfaces (API) help to permit applications to exchange data with a product without specifically tailoring the application to the product. However, in some instances, understanding types of data available within the product and the format of that data helps software developers to enhance the application to improve a product user experience.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
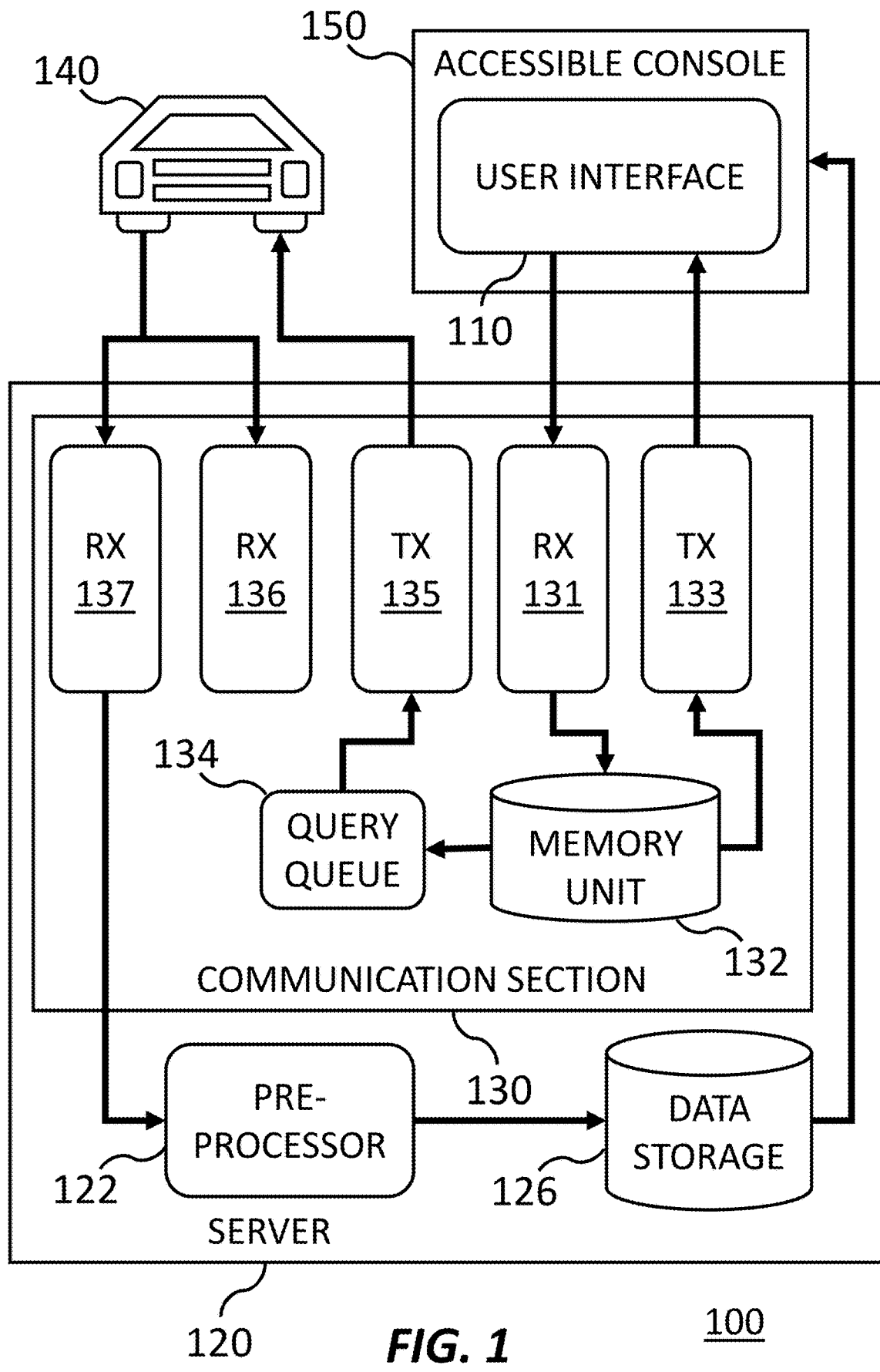
FIG. 1 is a schematic diagram of a system for mobile computing network content query and capture in accordance with at least some embodiments of the subject disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A vehicle fleet as a distributed database is expensive and time-consuming to duplicate, because all data must be uploaded from each vehicle, and the connectivity and bandwidth thereof is unstable and expensive. Querying a distributed database directly must be done carefully to ensure a query does not crash the system.

To help maintain working condition of the distributed database, i.e.—the working condition of each vehicle in the fleet, at least some embodiments herein screen queries for feasibility, and tailor queries for different models in the fleet.

In at least some embodiments, tailoring the query for a model includes referring to a database of computational resources and running processes for that model. In at least some embodiments, a process is crafted for execution on a specific model to help vehicles of that model avoid resource shortage. In at least some embodiments, even models having lower amounts of computational resources are programmed to perform more complex tasks, and the query creator is notified if the amount of time to gather the data is extreme. In at least some embodiments, a query engine estimates when the results can be obtained based on likelihood of encountering events producing the requested data, bandwidth to the server, and computational resources of the model.

In at least some embodiments, a vehicle is configured to execute the query to gather the requested data. In at least some embodiments, the vehicle is configured to store the requested data in the vehicle until one or more conditions are met for uploading the data. In at least some embodiments, a vehicle is configured to execute multiple queries and store multiple instances of requested data until uploading. In at least some embodiments, a vehicle is configured to compress, filter, or purge requested data, in response to unavailable storage resources, according to corresponding priority values established by the server. At least some embodiments herein enable querying a distributed database directly, and informing those querying of the likelihood and waiting time for receiving results.

A user, such as a software developer, an insurance provider, a market researcher and a law enforcement officer, is able to use an on-demand data retrieval (ODDR) system to enter a data request into a user interface, such as a graphical user interface (GUI). The software developer is a software developer who develops applications, middleware or OS (operating systems) to be run on the vehicle, for example. Example applications include automated-driving system applications, such as an object recognition application, a road recognition application, a sensor fusion application, a localization application, a path planner application, a controller application, etc. The data request is analyzed and stored in a server and then transmitted to a vehicle by the server. On the server side, the data requests are stored in a storage unit and a request queue is generated based on the stored requests. The user is able to see or request updates on a status of the data request. For example, while the data request is still within the server prior to transmission to the vehicle, the status may be indicated as "pending." Once the server transmits the data request to the vehicle, the status may be updated to "submitted." This allows the user to see and track the status of data requests made to the vehicle. One of ordinary skill in the art would recognize that the description refers to a vehicle for the sake of clarity; however, the description is applicable to groups of vehicles in addition to a single vehicle.

The user interface for generating the data request includes forms related to vehicle identifying information, data types being requested, start time and end time. In some embodiments, the start time and the end time are absolute times, such as Unix time, that is an elapsed time since a Unix epoch time. In some embodiments, the start time and the end time are relative times to the time that the data request is received by the vehicle. In some embodiments, the start time and the end time are relative times to a trigger event. The trigger event is the occurrence within the vehicle or in the environment surrounding the vehicle about which the user is seeking data or receipt of a data request by the vehicle. For example, a trigger event resulting from an environment surrounding the vehicle includes sudden acceleration, sudden braking, capturing an image of a target of a data request, detecting of a target of a data request or other suitable occurrences. The user information for monitoring a status of data requests includes identifying information of the data request and a status of the data request, such as pending or submitted.

In some embodiments, once the data request is received by the vehicle, the data request is processed to make the data request agnostic as to the source of the data request. In some embodiments, a data request identification (ID) is assigned to the received data request by the vehicle, for example by a request abstractor in the vehicle. In some embodiments, the data request ID is assigned to the data request prior to transmission of the data request to the vehicle. In some embodiments, a data request is generated by an application running in the vehicle and the application assigns the data request ID. In other words, the data is processed in a consistent manner regardless of a program or system that transmits the data request to the vehicle. In some embodiments, a data request is generated by a software component stored within the vehicle, and the data is processed in consistent with a data request received from an external device. This helps to sharing the same data collection software components among trigger data collection, where an application generates a data collection request to the logger, and the ODDR-based external data collection request.

In some embodiments, once the data request is received by the vehicle, the data request is processed to make the data request agnostic to the sensors within the vehicle and the server. In some embodiments, the data request is generated by an application running in the vehicle. In some embodiments, an application programming interface (API) is usable to make the data request from the application agnostic to the sensors within the vehicle or information from the server. This helps to maximize the user's ability to collect data without programming a request for specific sensor models. The data request is then transferred to a data collector and the requested data is collected in response to occurrence of the trigger event. In the situation where the trigger event had already occurred, such as a traffic accident, the data request is fulfilled based on data stored within a storage device within the vehicle. A time frame, i.e., start and end times, of the collected data is determined based on the data request. The collected data is transferred back to the server.

The collected data is then stored in the server and a notification is sent to the user regarding completion of the data request. For example, the status of the data request is updated to "complete" on the user interface.

In some instances, a budget management system or a payment system is implemented on the server side or vehicle side, such that the user is charged a fee for a data request. The fee is payable either at the submission of the request or at completion of data collection. The fee is adjustable based on the type and amount of data requested. In some embodiments, when the total amount of fee that is charged to the user reaches a maximum threshold of user's budget, the data request from the user is rejected.

This ODDR system allows users to access information collected by vehicle in an on-demand style. That is, the data is not necessarily continuously collected, but could be collected to satisfy specific desires of a user. In some embodiments, the ODDR system helps users, such as software developers, collecting data to update the design, implementation and parameter tuning of their software in an exploratory way based on collected data so that the users are able to continuously improve the software by delivering updates from the server to the vehicle via network, for example, as an Over-the-Air (OTA) update. In some embodiments, the ODDR system helps machine learning developers who develops machine learning model for the applications collecting data to train the model with the data which was not available when the model was initially developed so that the machine learning developers are able to update the models to fix weakness and issues of the model continuously. In some instances, an insurance provider would be able collect data related to a traffic accident. In some instances, law enforcement would be able to collect information related to a crime or a traffic accident.

FIG. 1 is a schematic diagram of a request retrieval system 100 in accordance with some embodiments. The request retrieval system 100 includes a user interface (UI) 110. The UI 110 is configured to receive a user request for data from a vehicle 140. The request retrieval system 100 further includes a server 120 configured to receive the user request from the UI 110; transmit the user request to the vehicle 140; receive data from the vehicle 140; and provide the data to the user via an accessible console 150. The server 120 includes a communication section 130 for communicating with the UI 110 and the vehicle 140. The request retrieval system 100 further includes an accessible console 150 configured to communicate data collected from the vehicle 140 to the user.

The UI 110 is configured to receive input instructions from the user. In some embodiments, the user includes a software developer. In some embodiments, the user includes a machine learning model developer. In some embodiments, the user includes an insurance provider. In some embodiments, the user includes law enforcement personnel. In some embodiments, the user includes a market research company. The UI 110 provides options for the user to select what type of vehicle and what type of data is being requested. In some embodiments, the UI 110 is capable of generating the data request using forms related to vehicle identifying information, data types being requested, start time and end time. In some embodiments, the start time and the end time are absolute times, such as Unix time, that is an elapsed time since a Unix epoch time. In some embodiments, the start time and the end time are relative times to the time that the data request is received by the vehicle. In some embodiments, the start time and the end time are relative times to a trigger event. In some embodiments, the UI 110 also provides the user with options for selecting a trigger event and a data collection duration relative to the trigger event. In some embodiments, the UI 110 includes information related to a type of vehicle from which data is requested. In some embodiments, the UI 110 includes vehicle ID which is able to uniquely identify a vehicle as a target of the request. For example, the vehicle ID includes a universally unique identifier (UUID) format. In some embodiments, the UI 110 includes data type that is able to identify the source of the data that user wants to collect. For example, the data type includes sensor ID of sensor that sensor data is collected from, application ID of application that application log is collected from. In some embodiment, the format of the sensor ID and application ID includes a universally unique identifier (UUID) format. In some embodiments, the UI 110 includes drop down menus. In some embodiments, the UI 110 includes editable fields for receiving information related to a data request. In some embodiments, the UI 110 provides information regarding what data option types are available to the user. In some embodiments, the data option types available depend on the user. For example, law enforcement is able to select more data options than an insurance provider in some embodiments.

In some embodiments, the UI 110 includes a graphical user interface (GUI). In some embodiments, the UI 110 includes a mobile terminal, such as a mobile telephone, connectable to the server 120. In some embodiments, the UI 110 includes a web interface such as RESTful API. In some embodiments, the UI 110 includes a computer connectable to the server 120. In some embodiments, the UI 110 is capable of wireless connection to the server 120. In some embodiments, the UI is connectable to the server 120 by a wired connection. The UI 110 is also able to provide the user with updates regarding a status of a data request. In some embodiments, the UI 110 provides status updates regarding a data request in response to an additional query by the user. In some embodiments, the UI 110 provides status updates regarding a data request upon receipt of updated information from the server 120 automatically without user interaction. In some embodiments, the status update causes the UI 110 to trigger an alert for the user. In some embodiments, the alert includes an audio or visual alert.

In some embodiments, the UI 110 includes a means for accepting payment of a fee from the user. In some embodiments, the UI 110 includes data entry fields to permit the user to enter payment card information. In some embodiments, the UI 110 includes a reader for detecting payment card information, such as a magnetic stripe reader, a bar code reader, a chip reader, or another suitable reader.

The server 120 includes a communication section 130 configured to communicate with the UI 110 and the vehicle 140. The communication section 130 includes a receiver 131 configured to receive data requests from the UI 110. In some embodiments, the receiver 131 includes a wireless receiver. In some embodiments, the receiver is configured to receive the data requests via a wired connection. In some embodiments, the receiver 131 is further configured to perform initial processing on the received data request. In some embodiments, the received data request includes priority level information. In some embodiments, the receiver 131 is configured to assign a priority level to the data request based on an identity of the user that submitted the data request or a fee paid by the user that submitted the data request. In some embodiments, the receiver 131 is configured to assign a request identification (ID) number to each received data request. In some embodiments, the server 120 is configured to limit access to certain sensors within the vehicle 140 based on an identity the user. For example, a third-party user will not be able to access sensor related to safety functions of the vehicle 140 in some embodiments.

The communication section 130 further includes a memory unit 132 configured to store data requests received by the receiver 131. In some embodiments, the memory unit 132 includes a random access memory, a solid state memory, or another type of memory. In some embodiments, the memory unit 132 is configured to store the data requests along with a status of the data request. In some embodiments, the status of the data request includes pending (prior to transmission of the data request to the vehicle 140); submitted (following transmission of the data request to the vehicle 140); and completed (following receipt of the requested data from the vehicle 140). In some embodiments, the memory unit 132 is accessible by the user. In some embodiments, updates to information in the memory unit 132 trigger notifications of a user associated with the information updated in the memory unit 132. In some embodiments, the memory unit 132 stores data requests in conjunction with time stamp data indicating a time at which the data request was received. In some embodiments, the memory unit 132 stores data requests in association with a priority level. In some embodiments, the priority level is determined based on an identity of the user. For example, in some embodiments, law enforcement has higher priority than an insurance provider, which has higher priority than a normal user, such as a software developer. In some embodiments, the priority level is determined based on a fee paid by the user. For example, in some embodiments, a user is able to pay a fee in order to increase a priority level of their request in order to obtain the requested data sooner. In some embodiments, the priority level of a data request is increased as an amount of time between initial storage of the data request and transmission of the data request to the vehicle increases.

The communication section 130 further includes a transmitter 133. The transmitter 133 is configured to transmit a status of data requests to the UI 110. In some embodiments, the status of the data requests is wirelessly transmitted to the UI 110. In some embodiments, the status of the data requests is transmitted to the UI 110 via a wired connection. In some embodiments, the transmitter 133 is configured to provide an update on a data request automatically in response to an update in the memory unit 132. In some embodiments, the transmitter 133 is configured to provide an update on a data request in response to a received update request from the user. In some embodiments, the transmitter 133 is configured to automatically transmit a request ID upon initially saving the data request in the memory unit 132. In some embodiments, the status of the data request includes a priority level of the data request. In some embodiments, the status of the data request includes an estimated time until the data request is transmitted to the vehicle 140.

The communication section 130 further includes a query queue 134 configured to store data requests in priority order for transmission to the vehicle 140. In some embodiments, the query queue 134 is integrated into the memory unit 132. In some embodiments, the query queue 134 is separate from the memory unit 132. In some embodiments, the query queue 134 is configured to retrieve data requests from the memory unit 132 based on priority level and time stamp information. In some embodiments, the query queue 134 is configured to order data requests based on priority level; and by time since initial saving in the memory unit 132 in response to data requests having a same priority level.

The communication section 130 further includes a transmitter 135 configured to transmit data requests to the vehicle 140 from the query queue 134. The transmitter 135 is configured to transmit the data requests to the vehicle 140 based on an order of the data requests in the query queue 134. In some embodiments, the data requests are transmitted to the vehicle 140 wirelessly. In some embodiments, the data requests are transmitted to the vehicle 140 by a wired connection. The data requests transmitted to the vehicle 140 include trigger event information, data duration information related to how long before and after the trigger event the data should be collected, and sensor information indicating a type of sensor of the vehicle 140 should collect the data. In some embodiments, the data requests transmitted to the vehicle 140 include priority level information. In some embodiments, the transmitter 135 is configured to transmit data requests to the vehicle 140 when the vehicle 140 sends a request to server 120 to transmit the data requests to the vehicle 140. In some embodiments, the transmitter 135 is configured to transmit data requests to the vehicle 140 any time the communication section 130 has sufficient connectivity to the vehicle 140 to transmit the data request unless the communication section 130 has received information indicating that the vehicle 140 is unable to accept a new data request. In some embodiments, the transmitter 135 is configured to transmit the data requests to the vehicle 140 periodically so long as the vehicle 140 is able to receive new data requests and the transmitter 135 has sufficient connectivity to the vehicle 140. In some embodiments, the transmitter 135 is configured to transmit the data requests to the vehicle 140 in batches, such as in groups of 5 data requests, 20 data requests or some other number of data requests. In some embodiments, the transmitter 135 is configured to request confirmation of receipt of the data request from the vehicle 140. In response to failing to receive confirmation of receipt from the vehicle for a predetermined time period, the transmitter 135 is configured to re-transmit the data request. In some embodiments, the status of the data request stored in the memory unit 132 is updated to indicate submission to the vehicle 140 in response to the communication section 130 receiving confirmation of receipt of the data request from the vehicle 140.

The communication section 130 further includes a receiver 136 configured to receive notification of the occurrence of trigger events from the vehicle 140. In some embodiments, the occurrence of a trigger event is receipt of a data request. In some embodiments, the receiver 136 is configured to receive the notification of the trigger events wirelessly. In some embodiments, the receiver 136 is configured to receive the notification of the trigger events via a wired connection. In some embodiments, the receiver 136 is configured to send a signal to the memory unit 132 to update a status of a data request related to the notified trigger event.

The communication section 130 further includes a receiver 137 configured to receive data from the vehicle 140 responsive to the data requests transmitted by the transmitter 135. In some embodiments, the data is split by the vehicle 140 into data packets that is the unit of transmission from the vehicle 140 to the server 120, and the receiver 137 receives the data packet from the vehicle 140. In some embodiments, the receiver 137 is configured to receive the data wirelessly. In some embodiments, the receiver 137 is configured to receive the data via a wired connection. In some embodiments, the receiver 137 is configured to send a signal to the memory unit 132 to update a status of a data request related to the receipt of requested data. In some embodiments, the data responsive a single data request is received in a single packet from the vehicle 140. In some embodiments, the data responsive to a single data request is received in multiple packets from the vehicle 140. The receiver 137 transfers the received data to a pre-processor 122.

The server 120 further includes the pre-processor 122 configured to receive data from the receiver 137 and perform pre-processing on the data to generate collected data. In some embodiments, the pre-processing includes reforming of data from multiple packets to compile data responsive to a data request. In some embodiments, the pre-processing includes de-serializing of data to compile structured data from a byte array that is received. In some embodiments, the pre-processing includes de-compressing of data if the data is compressed by the vehicle 140 before sending. In some embodiments, the pre-processing includes error correction by Error Correction Code (ECC) such as Reed-Solomon (RS) Code, Bose-Chaudhuri-Hocquenghem (BCH) code, Low-density parity-check (LDPC) code and the like. In some embodiments, the pre-processing includes smoothing of data by removing outlier values to reduce a risk of report incorrect data to the user. In some embodiments, the pre-processing includes associating data request ID information, priority level information or other suitable information with the received data from the receiver 137. In some embodiments, the data is pre-processed so that the information is provided to the user in a format that is easy to understand and does not rely on specialized knowledge or equipment to discern the information.

The server 120 further includes a data storage 126 configured to store the collected data generated by the data pre-processor 122. In some embodiments, the data storage 126 is integrated with the memory unit 132. In some embodiments, the data storage 126 is separate from the memory unit 132. In some embodiments, the data storage 126 includes a solid state drive (SSE), a random access memory or another suitable memory. In some embodiments, the data storage 126 is accessible by the user, e.g., using the UI 110 or an accessible console 150. In some embodiments, the data storage 126 is configured to notify the user in response to data related to a data request is available. In some embodiments, the notification includes an alert to the user. In some embodiments, the alert includes an audio or visual alert. In some embodiments, the data storage 126 is configured to cause the UI 110 or the accessible console 150 to automatically display the notification of an availability of the collected data. In some embodiments, the data storage 126 is accessible by a user using the accessible console 150 without the user submitting a data request. In some embodiments, the data within the data storage 126 are searchable by the user via the accessible console 150. In some embodiments, the collected data is visualized in the console 150.

The request retrieval system 100 further includes a vehicle 140. The vehicle 140 includes sensors to detect both an internal status of the vehicle 140 as well as an external environment surrounding the vehicle 140. In some embodiments, the sensors include a camera, a light distance and ranging (LiDAR) sensor, a radio distance and ranging (RADAR) sensor, a sound navigation and ranging (SONAR) sensor, an accelerometer, a steering wheel position, a speedometer, or another suitable sensor. The vehicle 140 is capable of receiving data requests, either wirelessly or via a wired connection.

In some embodiments, in response to receiving the data request, the vehicle 140 is configured to assign a data request ID to the received data request and the data request is processed to be agnostic to an originating system or program of the data request. In another embodiments, the communication section 130 instead of the vehicle 140 assigns the data request ID, and the data request ID is included in the data request that is sent from the communication section 130 to the vehicle 140. Making the data request agnostic to the originating system or program of the data request helps with expanding an ability of the vehicle 140 to receive and process a wide range of data requests from different users and systems. The vehicle 140 includes a processor for processing the data requests and determining what type of information from which sensors available in the vehicle 140 are capable of satisfying the data request. In at least some embodiments, the vehicle 140 includes a mobile computing network, which is a network of processors, controllers, or a combination thereof, such as a Controller Area Network (CAN). In at least some embodiments, each processor is an Electronic Control Unit (ECU). The vehicle 140 further includes a memory for storing data from the sensors. In some embodiments, the processor accesses the memory to determine whether any stored data is capable of satisfying the data request. The vehicle 140 is further capable of transmitting the data deemed to satisfy the data request to the server 120 either wirelessly or via a wired connection. In some embodiments, the processor is configured to attempt to satisfy received data requests in a priority order based on a received priority level of the data request. In some embodiments, the vehicle 140 is configured to transmit data to the server preferentially based on the received priority level of the data request.

In some embodiments, the memory and the processor of the vehicle 140 are configured to store and execute software applications in an electronic control unit (ECU) within the vehicle 140. In some embodiments, a data request is generated by the software application stored in the ECU. In some embodiments, the data request is generated in response to a trigger event, such as sudden acceleration, sudden braking, capturing sensor data including specific objects or specific scenes that are predefined in the software application, "crashing" of the software application, a detected abnormality in the software application, or another suitable detected occurrence. In some embodiments, the vehicle 140 is configured to generate a notification to a maintainer, e.g., the user, of the software application in response to detecting a trigger event associated with the software application. In some embodiments, the notification is transmitted, either wirelessly or through a wired connection, directly to the user, e.g., through the UI 110. In some embodiments, the notification is transmitted, either wirelessly or through a wired connection, to the user through the server 120. In some embodiments, the notification includes an audio or visual notification. In some embodiments, the notification is configured to cause the UI 110 to automatically display the notification without user interaction.

The request retrieval system 100 further includes an accessible console 150. The accessible console 150 permits the user to access the collected data stored in the data storage 126. In some embodiments, the accessible console 150 is integrated with the UI 110. In some embodiments, the accessible console 150 is separate from the UI 110. In some embodiments, the accessible console 150 includes another server separate from the server 120. In some embodiments, the accessible console 150 automatically receives collected data related to a data request from the user upon receipt of the collected data by the data storage 126. In some embodiments, the accessible console 150 permits the user to search the data storage 126 to determine whether any of the collected data stored in the data storage 126 are useful to the user without the user submitting a data request.

Using the request retrieval system 100 permits users to obtain information from one or more vehicles 140 in a format that is easy to understand without relying on specialized equipment to request or read the received data. The ability to prioritize data requests in the request retrieval system 100 help to ensure that law enforcement or other user is able to obtain data, while also permitting users to pay a fee to obtain data faster. This flexibility helps to improve the usefulness of the request retrieval system 100 for a wide range of users.

Figure 2:
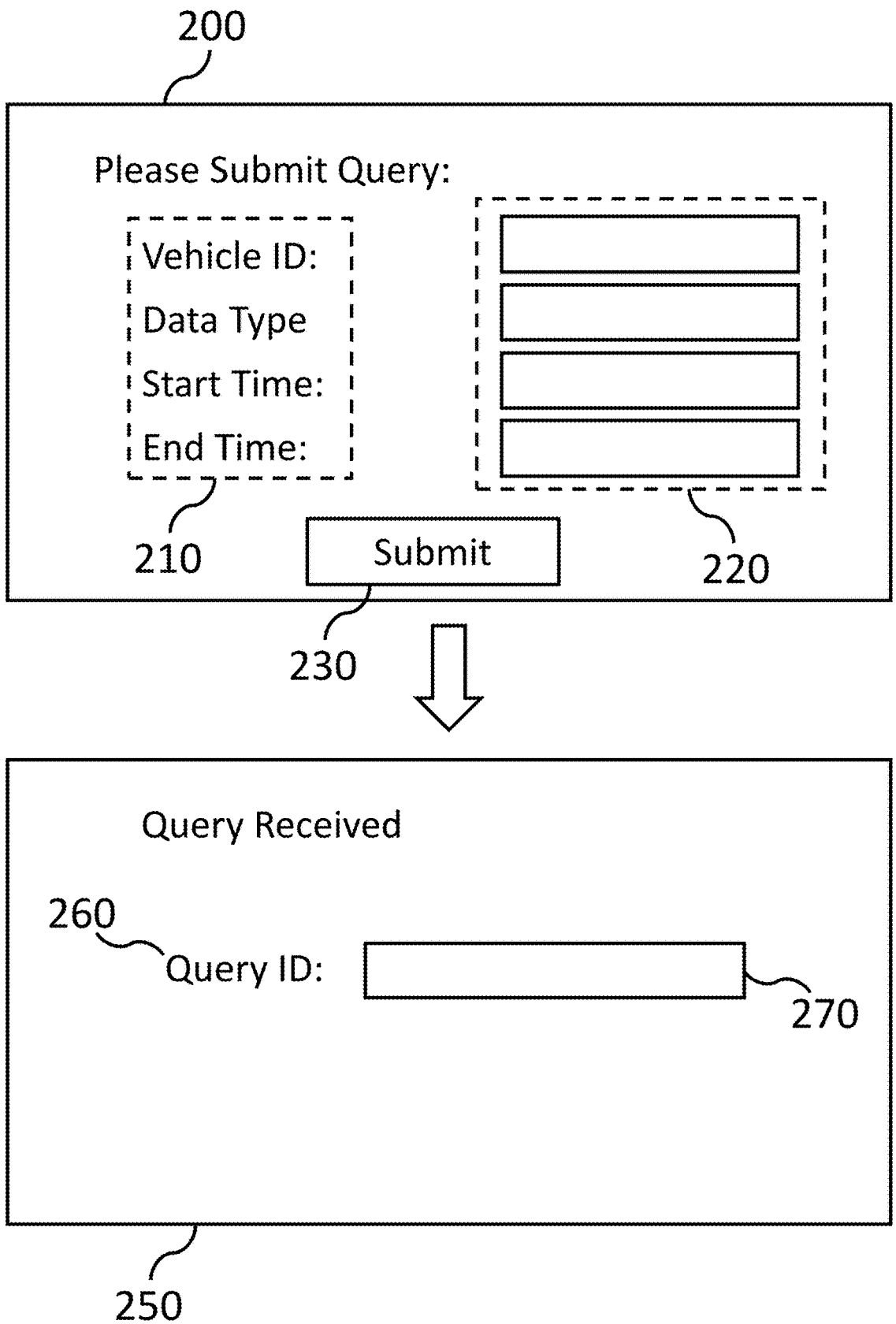
FIG. 2 is views of a graphical user interface (GUI) for mobile computing network content query in accordance with at least some embodiments of the subject disclosure.

FIG. 2 is views of a graphical user interface (GUI) 200 and 250 for request retrieval system in accordance with some embodiments. In some embodiments, the GUI 200 is usable as UI 110 in request retrieval system 100 (FIG. 1). In some embodiments, the GUI 200 is usable to generate a data request for receipt by the receiver 131 (FIG. 1). The GUI 200 includes a plurality of information types 210 which identify a type of information that the GUI 200 is able to accept from the user. The GUI 200 further includes a plurality of fields 220 configured to receive information related to a corresponding information type 210 of the GUI 200. The GUI 200 further includes a submit button 230 configured to submit a data request to a server, e.g., server 120 (FIG. 1), based on the information in the fields 220. One of ordinary skill in the art would recognize that the names and number of the plurality of information types 210 is merely exemplary and that different numbers and types of information are also within the scope of this disclosure.

In some embodiments, the fields 220 includes fields for users to enter the vehicle ID, the data type, the start time and the end time. In some embodiments, the field 220 further includes a field for users to enter a priority level of the data request. In some embodiments, the GUI 200 further includes information related to how a user is able to increase a priority level of a data request, such as indicating a fee associated with each available priority level. In some embodiments, the GUI 200 includes fields 220 for allowing a user to enter log in information to establish an identity of the user. In some embodiments, the GUI 200 is configured to display a priority level of the user following receiving log in information. In some embodiments, the GUI 200 further includes fields 220 for receiving payment information related to fees for establishing a priority level of a data request.

The GUI 250 is configured to be displayed to the user after the user has selected the submit button 230 on GUI 200. In some embodiments, the GUI 250 is usable as the GUI 110 in the ODDR system 100 (FIG. 1). The GUI 250 includes information indicating that the data request has been received. The GUI 250 includes a query ID label 260 and a query ID field 270. Information for populating the query ID field 270 is received from a server, e.g., server 120 (FIG. 1), following the server receiving and storing the data request. In some embodiments, the GUI 250 includes information of the vehicle ID. In some embodiments, the GUI 250 includes information related to a priority level of the data request. In some embodiments, the GUI 250 includes information regarding a status of the data request, such as pending, submitted, completed, etc. In some embodiments, the GUI 250 includes information related to an estimated time until the data request is submitted to a vehicle, e.g., vehicle 140 (FIG. 1). In at least some embodiments, the GUI 250 includes information related to an estimated time until the requested data is received. In at least some embodiments, the GUI 250 includes information related to an estimated energy expenditure to receive the requested data. In some embodiments, the GUI 250 is displayed automatically in response to receipt of query ID information from the server. In some embodiments, the GUI 250 is displayed in response to a user submitting a request for an update on an uploaded data request.

Figure 3:
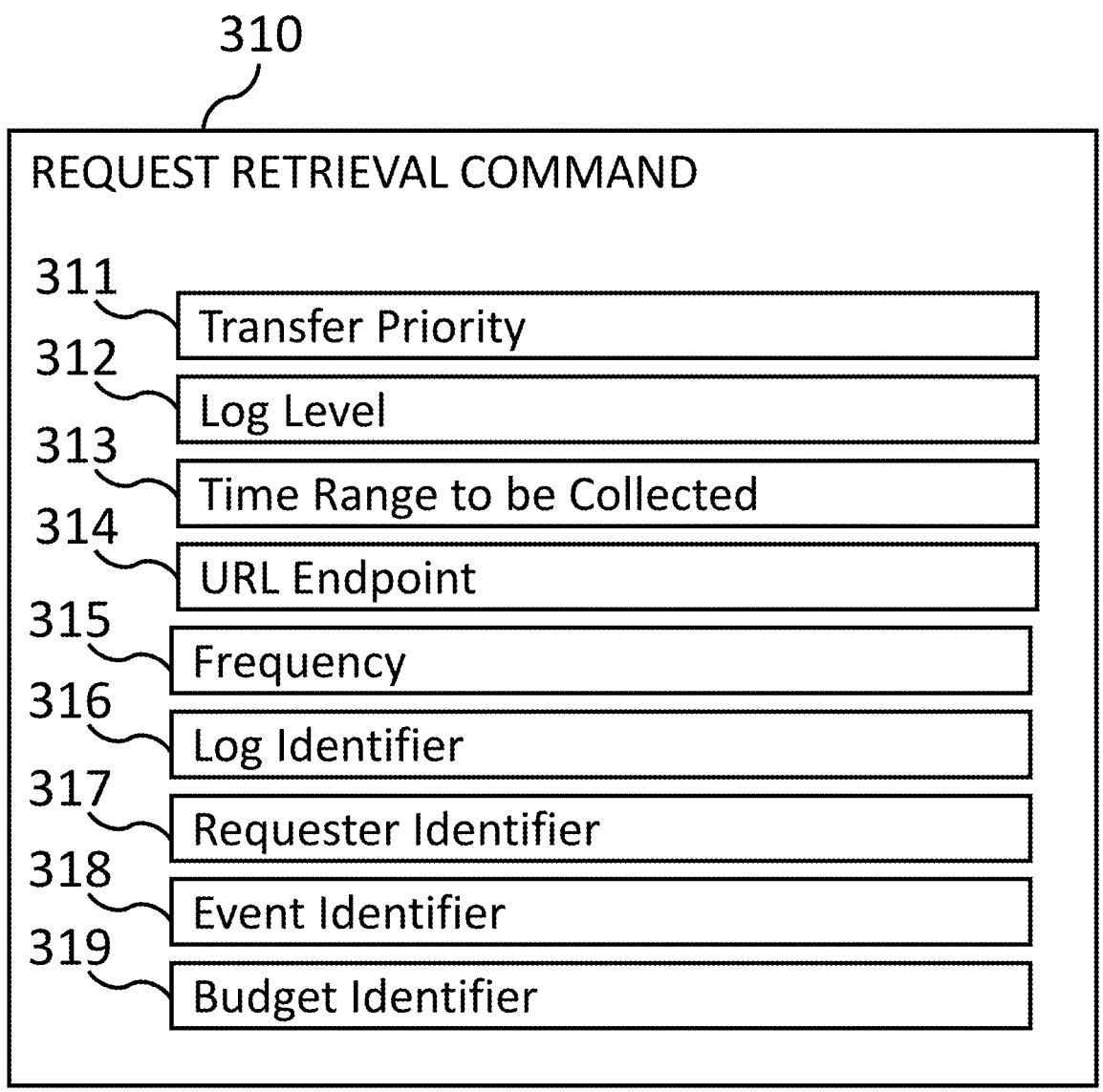
FIG. 3 is a diagram of a data structure of a content retrieval task in accordance with at least some embodiments of the subject disclosure.

FIG. 3 is a diagram of a data structure 300 of a request retrieval command 310 in accordance with some embodiments. In some embodiments, the request retrieval command 310 is transmitted from the server 120 to the vehicle 140 (FIG. 1). The request retrieval command 310 includes information related to a type of data sought by a data request to a vehicle, e.g., vehicle 140 (FIG. 1).

The request retrieval command 310 includes a transfer priority parameter 311 that indicates a priority level of the data request. The request retrieval command 310 further includes a log level parameter 312 that indicates what type of data, if any, should be retrieved from other applications on the vehicle. For example, in some embodiments, the request retrieval command 310 retrieves data from an object recognition application. The log level parameter 312 determines what type of data to retrieve from the other application, such as error level or critical level. In some embodiments, the log level parameter 312 is omitted from the request retrieval command 310 or the log level parameter 312 is left in a null state. The request retrieval command 310 further includes a time range to be collected parameter 313 that indicates a time period before and/or after a trigger event to collect data. The time range is corresponding to the start time and the end time that was entered in GUI 200 (FIG. 2) by the users. The request retrieval command 310 further includes a uniform resource locator (URL) endpoint parameter 314 that indicates a destination for the data collected in response to the data request. The request retrieval command 310 further includes a frequency parameter 315 that indicates how often, if ever, the data should be sampled from the rime range 313. For example, when the event time is t=100 sec, the time range comprises start time=−1 sec and end time=2 sec and the frequency is 10 Hz (100 msec cycle), then the data at t=99.0 sec, 99.1 sec, 99.2 sec, . . . , 101.9 sec, 102.0 sec is collected by the request retrieval command. The request retrieval command 310 further includes a log ID parameter 316 that indicates types of sensors and/or applications usable to collect the data requested by the data request. In some embodiments, unique IDs (such as Universally unique identifier (UUID)) are pre-assigned to all the sensors and applications, and the unique IDs which the user want to collect data from is specified in the log ID parameter 316. The request retrieval command 310 further includes a requester ID parameter 317 that indicates an identity of the user that made the data request. The request retrieval command 310 further includes an event ID parameter 318 that indicates a trigger event associated with the data request. The request retrieval command 310 further includes a budget ID parameter 319 that indicates how much of the resources of the vehicle, e.g., vehicle 140 (FIG. 1), should be allocated to satisfying the data request. One of ordinary skill in the art would understand that additional parameters are possible in the request retrieval command 310. For example, in some embodiments, the request retrieval command 310 includes vehicle location parameter that indicates a geographic area where the trigger event is capable of occurring. One of ordinary skill in the art would also understand that the request retrieval command 310 does not always include all of the parameters in FIG. 3. For example, in some embodiments, the budget ID parameter 319 is omitted.

Figure 4:
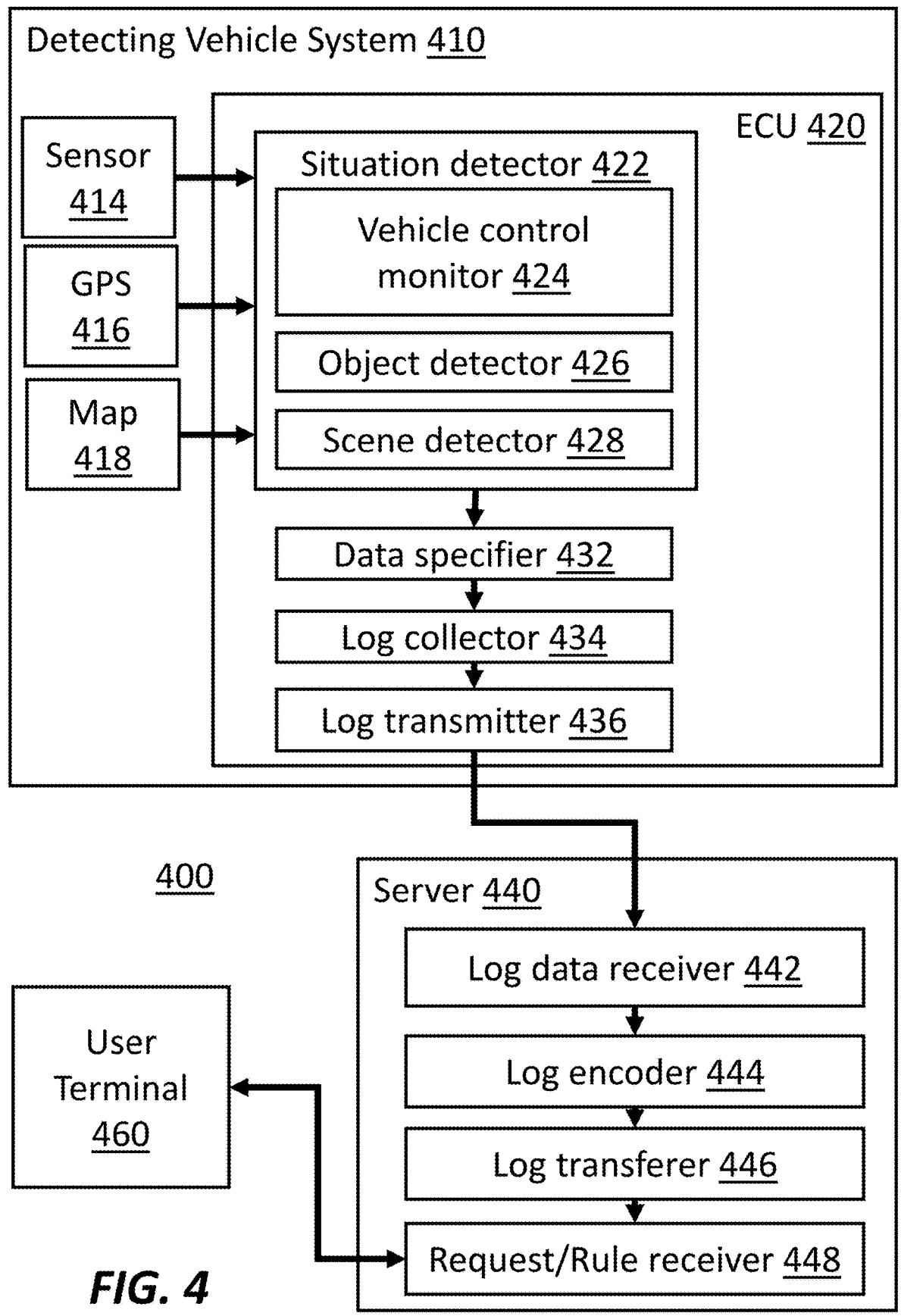
FIG. 4 is a schematic diagram of a queried content retrieval system in accordance with at least some embodiments of the subject disclosure.

FIG. 4 is a block diagram of a request retrieval system 400, in accordance with some embodiments. In some embodiments, the request retrieval system 400 is part of the request retrieval system 100 (FIG. 1). In some embodiments, the request retrieval system 400 is usable in conjunction with the request retrieval system 100 (FIG. 1). In some embodiments, the request retrieval system 400 is separate from the request retrieval system 100 (FIG. 1).

The request retrieval system 400 includes a detecting vehicle system 410 configured to capture information about a vehicle or surroundings of the vehicle. The detecting vehicle system 110 captures information about the vehicle and the surroundings and transmits the information to a server. The request retrieval system 400 further includes a server 440 configured to receive the information, encode the information, and disseminate the information to a user terminal 460.

The detecting vehicle system 410 includes an electronic control unit (ECU) 420 configured to receive data from a sensor 414, a global positioning system (GPS) 416 and a map 418. The ECU 420 includes a situation detector 422, a data specifier 432, a log collector 434 and a log transmitter 436. The situation detector 422 includes a vehicle control monitor 424, an object detector 426, and a scene detector 428.

In some embodiments, the ECU 420 further includes a localization unit configured to receive data from the GPS 416 and the map 418 and determine a position of the vehicle and a pose and state of the vehicle relative to detected and/or known objects and/or road position. A pose is an orientation of the vehicle relative to a reference point, such as a roadway. In some embodiments, the position of the vehicle also refers to a position vector of the vehicle. The pose and state of the vehicle refers to a speed and a heading of the vehicle. In some embodiments, the pose and state of the vehicle also refers to a velocity vector, an acceleration vector and jerk vector of the vehicle. In some embodiments, the position vector, the velocity vector, the acceleration vector, and the jerk vector include angle vector. In some embodiments, the state of the vehicle also refers to whether an engine or motor of the vehicle is running.

The sensor 414 is configured to capture information, such as images, of an environment surrounding the vehicle. In some embodiments, the sensor 414 includes a visible light camera, an IR camera. In some embodiments, the sensor 414 is replaced with or is further accompanied by a light detection and ranging (LiDAR) sensor, a radio detection and ranging (RADAR) sensor, a sound navigation and ranging (SONAR) sensor or another suitable sensor. In some embodiments, the sensor 414 includes additional cameras located at other locations on the vehicle. For example, in some embodiments, additional cameras are located on sides of the vehicle in order to detect a larger portion of the environment to the left and right of the viewing vehicle. Since vehicle occupants are able to look out of side windows of the vehicle, using additional cameras to detect a larger portion of the environment surrounding the vehicle helps to increase precision of detecting objects or scenes surrounding the vehicle. For example, in some embodiments, additional cameras are located on a back side of the vehicle in order to detect a larger portion of the environment to a rear of the vehicle. This information helps to capture information about objects. In some embodiments, the data from the sensor 414 includes a timestamp or other metadata in order to help synchronize the data from the sensor 414 with the data from other components.

The GPS 416 is configured to determine a location of the vehicle. Knowing the location of the viewing vehicle helps to relate an object or scene with determined locations on the map 418.

The map 418 includes information related to the roadway and known objects along the roadway. In some embodiments, the map 418 is usable in conjunction with the GPS 416 to determine a location and a heading of the vehicle. In some embodiments, the map 418 is received from an external device, such as the server 440. In some embodiments, the map 418 is periodically updated based on information from the sensor 414 and/or the GPS 416. In some embodiments, the map 418 is periodically updated based on information received from the external device. In some embodiments, the map 418 is generated from sensor data by simultaneous localization and mapping (SLAM) algorithm. Including the map 418 helps to determine whether an object is a known object. Including the map 118 having known objects helps to increase precision of new object detection.

The situation detector 422 is configured to generate information related to performance of the vehicle and of systems within the vehicle. The situation detector 422 is able to collect information from components within the vehicle, such as the sensor 414, braking systems, acceleration system, and other suitable components. Utilizing this information, the situation detector 422 is able to determine performance of the vehicle. In some embodiments, the situation detector 422 is further configured to monitor performance of software and networking operations within the vehicle. For example, in some embodiments, the situation detector 422 is configured to receive information related to "crashing" of software or applications within the vehicle. In some embodiments, the situation detector 422 is configured to collect information regarding a storage capacity of a memory device within the vehicle. In some embodiments, the situation detector 422 is configured to receive information related to a processing capability of a processor within the vehicle.

The vehicle control monitor 424 is configured to receive sensor data and control logs related to current operation of the vehicle. In some embodiments, the sensor data includes information related to vehicle speed, acceleration, jerk, braking, steering, pitching, rolling, yawing, blinking hazard lamp, horn beeping, or other suitable information. The vehicle control monitor 424 is configured to determine whether any of the received sensor data indicates the satisfaction of a criteria for fulfilling a request, e.g., a trigger event was detected.

The object detector 426 is configured to receive sensor data from the sensor 414 to determine whether any abnormal objects are located in the roadway. In some embodiments, the object detector 426 is further configured to determine whether any objects are present along or adjacent to the roadway. In some embodiments, the sensor data from the sensor 414 includes an image and the object detector 426 is configured to perform image recognition on the received image, e.g., using a trained neural network, to identify abnormal objects. In some embodiments, the object detector 426 is configured to compare any identified objects with information from the GPS 416 and the map 418 to help determine a type of an identified object. In some embodiments, the object detector 426 is configured to identify objects, e.g., a tire, a car part, etc., an animal, a pothole, a traffic regulation board, an emergency vehicle, a vehicle with hazard lights active, or other suitable objects as objects.

The scene detector 428 is configured to receive the sensor data from the sensor 414 to determine whether any scenes are located in an environment surrounding the vehicle that satisfy a condition for fulfilling a request. In some embodiments, the scene detector 428 is configured to determine that a vehicle accident has occurred in response to detecting that two or more vehicles are in contact with one another or that a vehicle is surrounded by multiple fallen objects. In some embodiments, the scene detector 428 is configured to determine that construction is occurring based on detecting multiple construction vehicles in close proximity. In some embodiments, the scene detector 428 is configured to determine that a vehicle is parked on a shoulder of the roadway based on determining that a vehicle is located adjacent to the roadway and is not moving or is moving significantly slower than other vehicles. In some embodiments, the scene detector 428 is configured to use image recognition, such as through a trained neural network, to determine contents of a scene surrounding the vehicle.

In some embodiments, each of the object detector 426 and the scene detector 428 are active during an entire period of operation of the vehicle, e.g., when an engine or motor of the vehicle is running. In some embodiments, at least one of the object detector 426 or the scene detector 428 is activated in response to the vehicle control monitor 424 determining that a specific behavior, e.g., trigger event, was detected.

The data specifier 432 is configured to receive a determination that a fulfillment of a request was performed or that a trigger event was detected. The data specifier 432 is configured to analyze the received information to determine what sensor data from the sensor 414 should be collected based on the received data. For example, in some embodiments where an abnormal steering behavior by the driver is detected, the data specifier 432 is configured to determine that image data from a front camera of the sensor 414 should be captured. Further, the data specifier 432 is configured to determine a time period over which the data from the determine sensor should be collected based on a time of the detected situation. In some embodiments, the data specifier 432 is configured to determine the sensor 414 from which to collect data based on instructions in a received request from user.

In some embodiments, the data specifier 432 is configured to determine a region of the received sensor data that is relevant to the detected situation. In some embodiments, the region of the received sensor data is identified based on object recognition performed on the sensor data, e.g., by the object detector 426 or the scene detector 428. In some embodiments, the data specifier 432 is configured to crop a received image from the sensor data or remove extraneous data from the sensor data if the sensor data is not an image to reduce an amount of information in a log of the abnormal situation. In some embodiments, the data specifier 432 is configured to remove personal information such as license plate, human faces, etc. from the sensor data.

The log collector 434 is configured to receive data from the data specifier 432. In some embodiments, the log collector 434 is configured to receive data directly from the sensor 414, the GPS 416, or the situation detector 422 based on information provided by the data specifier 432. The log collector 434 is also configured to determine what information is useful for identifying the type and location of the object, such as location information from the GPS 416 or the map 418, image information from the sensor 414, cropped or reduced information from the data specifier 432, timestamp information related to a time the object or scene was detected, or other suitable information.

The log collector 434 generates log data based on the received and correlated data, such as the cropped image and location data. The log collector 434 also associates timestamp information with the log data in order to assist with synchronization of the collected data and for queue priority within the server 440. In some embodiments, the log collector 434 generates the log data to further include world coordinates associated with the cropped image. In some embodiments, the log collector 434 generates the log data to further include a map location associated with the cropped image. In some embodiments, the log collector 434 includes additional information to assist in increasing accuracy of determining the object or scene.

While the above description relates to generating log data based on an image from the sensor 414, one of ordinary skill in the art would understand that the log collector 434 is not limited solely to generating log data based on images. In some embodiments, the log collector 434 is configured to generate log data based on information from other sensors attached to the vehicle, such as RADAR, LiDAR, or other suitable sensors. In some embodiments where the occupant is wearing smart glasses, the log collector 434 is further configured to generate the log data based on information received from the smart glasses.

The log transmitter 436 is configured to receive log data from the log collector 434 and transmit the log data to the server 440. In some embodiments, the log transmitter 436 is configured to transmit the log data wirelessly. In some embodiments, the log transmitter 436 is configured to transmit the log data via a wired connection. In some embodiments, the log transmitter 436 is configured to transmit the log data to the user terminal 460 directly. In some embodiments, the log transmitter 436 is configured to transmit the log data to a mobile device accessible by the user, which in turn is configured to transmit the log data to the server 440. In some embodiments, the log transmitter 436 is configured to transmit the log data to the mobile device using Bluetooth® or another suitable wireless technology. In some embodiments, the ECU 420 is configured to determine whether the data transfer rate from the mobile device to the server 440 is higher than a transfer rate from the log transmitter 436 to the server 440. In response to a determination that the data transfer rate from the mobile device to the sever 440 is higher, the log transmitter 436 is configured to transmit the log data to the mobile device to be transmitted to the server 440. In response to a determination that the data transfer rate from the mobile device to the server 440 is not higher, the log transmitter 436 is configured to transmit the log data to the server 440 from the vehicle system 410 directly without transferring the log data to the mobile device.

In some embodiments, the detecting vehicle system 410 further includes a memory configured to store sensor data from sensors attached to the vehicle. In some embodiments, the memory is further configured to store information associated with previously detected objects or scenes. In some embodiments, in response to detecting an object or scene that matches a previous object or scene, the data specifier 434 is configured to provide results based on the matching object or scene. In some embodiments, the detecting vehicle system 410 is further configured to determine whether the detecting vehicle has received from the server 440 information related to an object or scene that matches the determined object or scene from the situation detector 422. In some embodiments, in response to determining that the detecting vehicle has already received information related to the determined object or scene, the detecting vehicle system 410 is configured to prevent transmission of the log data to the server 440. Avoiding transmission of redundant information to the server 440 helps to reduce data transmitted to the server 440 and helps to minimize power consumption by the detecting vehicle system 410. In some embodiment, the storing of the previous requests is called caching. One of ordinary skill in the art would understand caching as using hardware or software to store data so that future requests for that data are able to be served faster.

The server 440 includes a log data receiver 442 configured to receive the log data from the log transmitter 436. In some embodiments, the log data receiver 442 is configured to receive the log data from the mobile device. The server 440 further includes a log encoder 444 configured to encode the log data. The server 440 further includes a log transferrer 446 configured to transmit the encoded log data to the user terminal 160. The server 440 further includes a request/rule receiver 448 configured to receive a request or a rule from the user terminal 460.

The log data receiver 442 is configured to receive the log data from the log transmitter 436. In some embodiments, the log data receiver 442 is configured to receive the log data from the mobile device. In some embodiments, the log data receiver 442 is configured to receive the log data wirelessly. In some embodiments, the log data receiver 442 is configured to receive the log data via a wired connection. In some embodiments, the log data receiver 442 is configured to attach a timestamp for a time that the log data was received to the log data.

The log encoder 444 is configured to encode the received log data according to a predetermined encoding protocol. Encoding the log data according to a predetermined encoding protocol helps to ensure that the user terminal 460 is able to reliably decode the log data for use by the user terminal 460. In some embodiments, the log encoder 444 is configured to perform compression of the log data, image encoding, thumbnail image creation, or other suitable encoding protocols. In some embodiments, the log encoder 444 is configured to perform encryption of the log data. In some embodiments, the log encoder 444 is further configured to perform super-resolution to make the data more visible for the user. One of ordinary skill in the art would understand that super-resolution is a process of receiving a high-resolution image from a low-resolution image. Improving the resolution of the log data helps to reduce false positives or false negatives.

In some embodiments, the server 440 further includes a database for storing received log data. In some embodiments, the log data is stored in the database prior to and/or after encoding by the log encoder 444. In some embodiments, the log data is stored in the database in a priority queue. In some embodiments, the priority of the priority queue is determined based on a time that the object or scene, e.g., a trigger event, was detected, a time that the log data was received by the log data receiver 442, a type of the object or scene, an identity of the driver of the detecting vehicle, or other suitable priority criteria.

The log transferer 446 is configured to receive the encoded log data from the log encoder 444. The log transferer 446 is configured to transmit the encoded to the user terminal 460. In some embodiments, the log transferer 446 is configured to transmit the encoded log data to a mobile device accessible by the user. In some embodiments, the log transferer 446 is configured to transfer the encoded log data wirelessly. In some embodiments, the log transferer 446 is configured to transmit the encoded log data via a wired connection. In some embodiments, the log transferer 446 is configured to transmit encoding protocol information along with the encoded log data. Transmitting the encoding protocol information for the encoded log data helps the mobile device or the user terminal 460 to accurately decode the encoded log data for use by the user terminal 460.

The request/rule receiver 448 is configured to receive new or updated rules or requests for data from a user. In some embodiments, the request/rule receiver 448 is configured to receive the new or updated rules or requests wirelessly. In some embodiments, the request/rule receiver 448 is configured to receive the new or updated rules or request via a wired connection. In some embodiments, the request/rule receiver 448 from the UI 110 (FIG. 1).

In some embodiments, the server 440 is configured to receive location in formation from multiple vehicles. In some embodiments, the server 440 is configured to receive navigation plans from multiple vehicles. In some embodiments, the log transferer 446 is configured to limit the transmission of encoded log data to only vehicles that are within a predetermined distance of the detected trigger event.

In some embodiments, the server 440 is configured to transmit only log data associated with a newly detected trigger event. That is, if the trigger event has already been reported by the server 440, the trigger event is not reported again. Limiting the repetitive reporting of trigger event helps to reduce redundant data received by user terminals to the server 440.

The user terminal 460 is a user terminal accessible by a user associated with a fulfilled request. In some embodiments, the user terminal 460 includes a GUI. In some embodiments, the user terminal 460 is configured to automatically generate an alert in response to received data from the server 440. In some embodiments, the alert includes an audio or visual alert.

One of ordinary skill in the art would understand that modifications to the request retrieval system 400 are within the scope of this disclosure. For example, in some embodiments, the detecting vehicle system 410 is able to transmit log data directly to the user terminal 460 over a network, such as a wireless network. In some embodiments, a mobile device of an occupant in the detecting vehicle is able to transmit log data directly to the user terminal 460, such as a wireless network.

By automatically identifying and disseminating information related to satisfaction of rule or requests detected within the vehicle or in an environment surrounding a vehicle, the user is able to improve performance of applications or software executed using a processing system of the vehicle, e.g., the ECU 420. In some embodiments, the user is able to object information related to events such as accidents.

Figure 5:
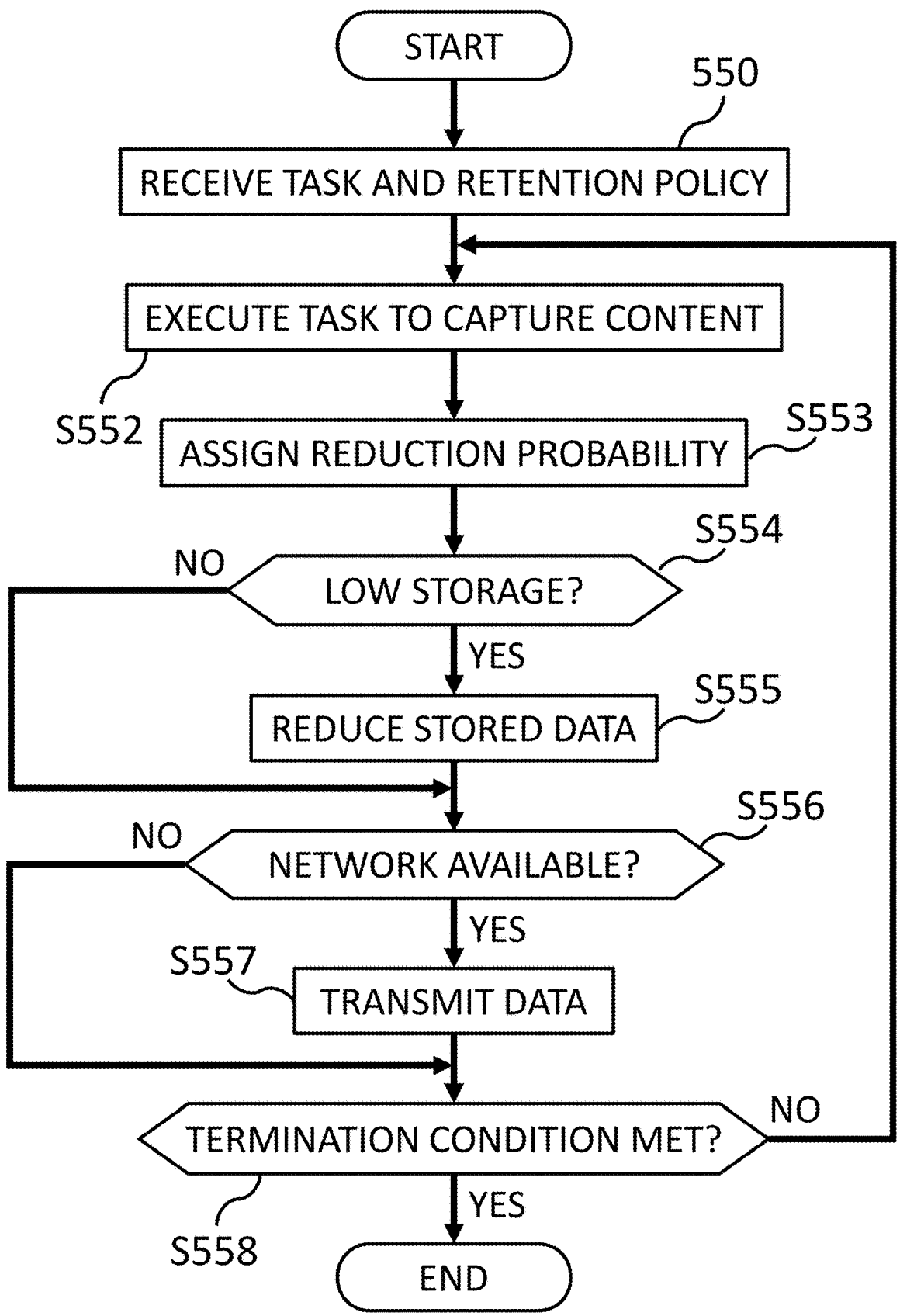
FIG. 5 is an operational flow for mobile computing network queried content capture in accordance with at least some embodiments of the subject disclosure.

FIG. 5 is an operational flow for mobile computing network queried content capture in accordance with at least some embodiments of the subject disclosure. The operational flow provides a method of mobile computing network queried content capture. In at least some embodiments, the method is performed by a mobile computing network, such as vehicle 140 shown in FIG. 1 or detecting vehicle system 410 shown in FIG. 4. In at least some embodiments, the method is performed by one or more processors of the mobile computing network collectively including sections for performing certain operations, such as ECU 420 shown in FIG. 4.

At 550, a receiving section receives a content capture task and retention policy. In at least some embodiments, the receiving section receives, from a server, a task executable by a mobile computing network, and a retention policy. In at least some embodiments, the server is in communication with the receiving section through a communication network, such as network 914 of FIG. 9, which will be explained hereinafter. In at least some embodiments, the server is server 120 of FIG. 1 or server 440 in FIG. 4. In at least some embodiments, the task includes a program to capture target content. In at least some embodiments, the task is programmed to be executed by the mobile computing network using available resources of the mobile computing network. In at least some embodiments, the task includes instructions for detecting the target content from at least one sensor. In at least some embodiments, the task is programmed to consume available resources and avoid interfering with other concurrently executed tasks.

At S552, an executing section executes the task to capture content. In at least some embodiments, the executing section executes the task using the mobile computing network to capture target content. In at least some embodiments, the executing section instructs at least one sensor to detect the target content. In at least some embodiments, the executing section instructs the at least one sensor to record the target content onto volatile memory in response to detecting the target content. In at least some embodiments, the executing section performs the operational flow shown in FIG. 6, which will be explained hereinafter.

At S553, an assigning section assigns a reduction probability. In at least some embodiments, the assigning section assigns, to a first instance of captured target content, a probability of reducing based on the retention policy. In at least some embodiments, the assigning section assigns a probability according to the priority value relative to another priority value of a concurrently executed task. In at least some embodiments, the retention policy includes a probability of purging each instance of captured target content, the probability of purging inversely related to the priority value. In at least some embodiments, the probability of purging is a function of age and priority value. In at least some embodiments, the assigning section performs the operational flow shown in FIG. 7, which will be explained hereinafter.

At S554, the mobile computing network determines whether storage is low. In at least some embodiments, the mobile computing network determines whether the amount of consumed storage exceeds a threshold level. In at least some embodiments, the mobile computing network determines whether the amount of remaining storage is less than a threshold level. In at least some embodiments, the mobile computing network also determines whether memory is low, and performs operations in response to each determination. If the mobile computing network determines that storage is not low, then the operational flow proceeds to network connection determination at S556. If the mobile computing network determines that storage is low, then the operational flow proceeds to stored data reduction at S555.

At S555, a reducing section reduces stored data. In at least some embodiments, the reducing section reduces, in response to an amount of available storage becoming equal to or lower than a threshold amount, at least one of the first instance or a portion of other stored data based on the probability of reducing. In at least some embodiments, the reducing section determines by which content to reduce consumed storage space based on assigned reduction probabilities. In at least some embodiments, the reducing section generates a random number to determine by which content to reduce consumed storage space in accordance with the assigned reduction probabilities. In at least some embodiments, the reducing section updates the probability of reducing assigned to the first instance based on the retention policy and an age of the first instance before determining by which content to reduce consumed storage space. In at least some embodiments, the reducing section purges, in response to an amount of available storage becoming equal to or lower than a threshold amount, the instance of captured content. In at least some embodiments, the reducing section filters, in response to an amount of available storage becoming equal to or lower than a threshold amount, the first instance using the filtering sub-task of captured content. In at least some embodiments, the reducing section compresses, in response to an amount of available storage becoming equal to or lower than a threshold amount, the first instance using the compression sub-task of captured content.

At S556, the mobile computing network determines whether a network connection is available. In at least some embodiments, the mobile computing network determines whether a wireless communication transceiver detects an available access point. If the mobile computing network determines that a network connection is available, then the operational flow proceeds to data transmission at S557. If the mobile computing network determines that a network connection is not available, then the operational flow proceeds to termination condition determination at S558.

AT S557, a transmitting section transmits data. In at least some embodiments, the transmitting section transmits, in response to connecting to a wide area network, each instance of captured target content. In at least some embodiments, the transmitting section transmits instances of target content to the server in order by priority according to a content transmission policy. In at least some embodiments, the transmitting section performs the operational flow shown in FIG. 8, which will be explained hereinafter.

At S558, the mobile computing network determines whether a termination condition has been met. In at least some embodiments, the mobile computing network determines whether a sufficient amount of target content has been captured and transmitted. If the mobile computing network determines that the termination condition is not yet met, then the operational flow returns to task execution at S552. If the mobile computing network determines that the termination condition is met, then the operational flow ends.

Figure 6:
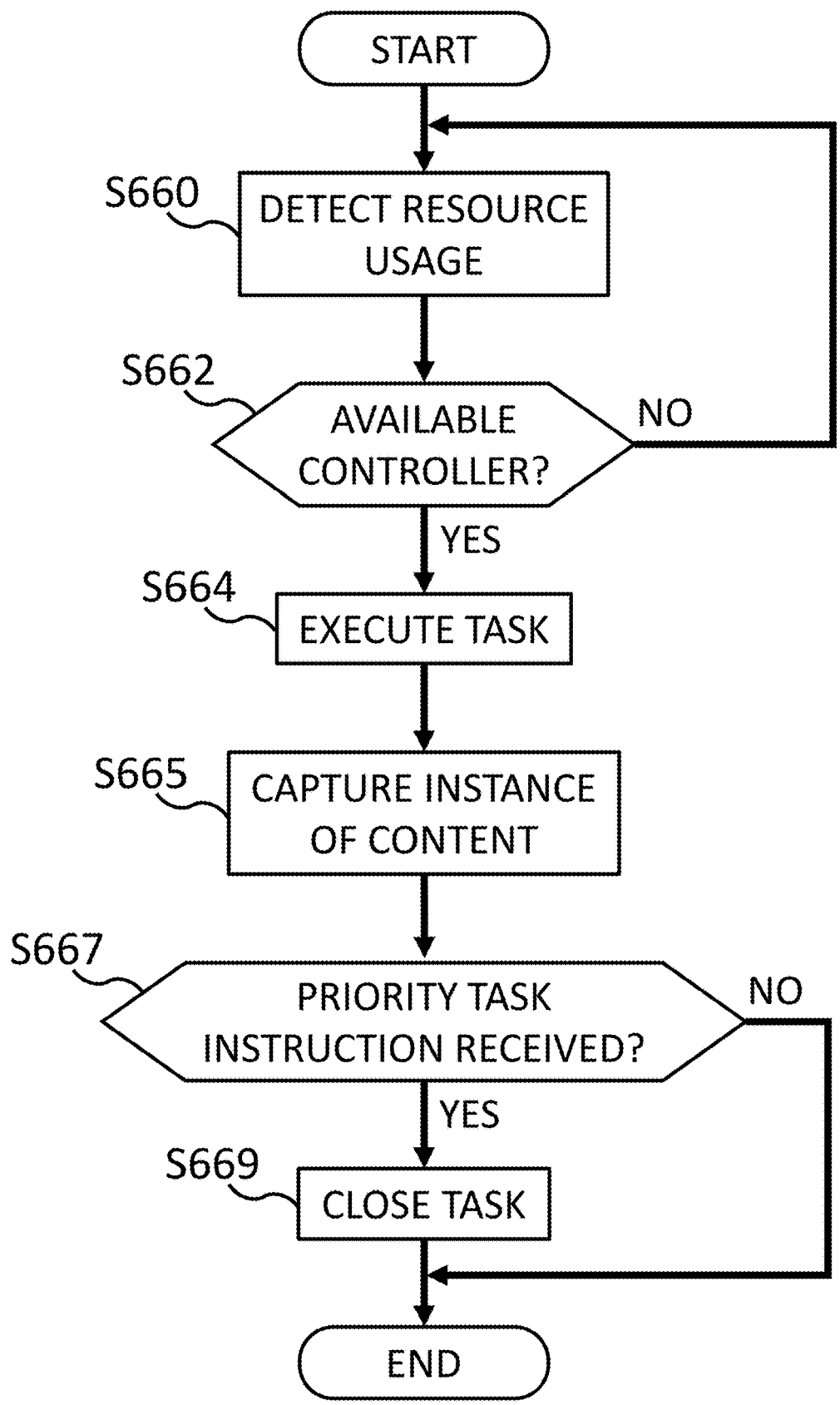
FIG. 6 is an operational flow for executing a content capture task in accordance with at least some embodiments of the subject disclosure.

FIG. 6 is an operational flow for executing a content capture task in accordance with at least some embodiments of the subject disclosure. The operational flow provides a method of executing a content capture task. In at least some embodiments, the method is performed by a mobile computing network, such as vehicle 140 shown in FIG. 1 or detecting vehicle system 410 shown in FIG. 4. In at least some embodiments, the method is performed by an executing section of one or more processors of the mobile computing network collectively including sections for performing certain operations, such as ECU 420 shown in FIG. 4.

At S660, the executing section detects resource usage. In at least some embodiments, the executing section detects resource usage of each controller among a plurality of controllers. In at least some embodiments, the controllers are included in the mobile computing network, such as ECU 420 shown in FIG. 4, which are also referred to as processors. In at least some embodiments, the executing section detects resource usage based on a number of active threads. In at least some embodiments, the executing section detects resource usage based on internal cache memory consumption.

At S662, the executing section determines whether any controllers are available. In at least some embodiments, the executing section determines an available controller based on resource usage. In at least some embodiments, the executing section determines whether resource usage of each controller among a plurality of controllers is less than a threshold amount. In at least some embodiments, the executing section determines that a resource usage of the available controller is less than a threshold amount. If the executing section determines that no controllers are available, then the operational flow returns to resource usage detection at S660. If the executing section determines that at least one controller is available, then the operational flow proceeds to task execution at S664.

At S664, the executing section executes the task. In at least some embodiments, the executing section causes an available controller to execute the task in response to detecting that a resource usage of the available controller is less than a threshold amount. In at least some embodiments, the executing section executes the task within a sandbox of limited computational resources. In at least some embodiments, the sandbox is a computing environment that is secure and isolated from the rest of the mobile computing network, such as a virtual machine or container running within the mobile computing network.

At S665, the executing section captures an instance of content. In at least some embodiments, the executing section causes at least one sensor to record the target content onto volatile memory in response to detecting the target content. In at least some embodiments, the target content is a video recording of an environment. In at least some embodiments, the target content is readings from motor sensors during an extreme event. In at least some embodiments, the executing section transfers the recorded content to storage from the volatile memory.

At S667, the executing section determines whether a priority task instruction is received. In at least some embodiments, the executing section determines whether another task having a higher priority has been received, such as through the task receiving operation at S550 of FIG. 1. If the executing section determines that a priority task instruction is received, then the operational flow proceeds to task closing at S669. If the executing section determines that no task instructions having higher priority have been received, then the operational flow ends.

At S669, the executing section closes the task. In at least some embodiments, the executing section closes the task in response to receiving an instruction to execute a priority task. In at least some embodiments, the executing section closes the task in response to determining that the task has the lowest priority among tasks currently executed by the controller.

Figure 7:
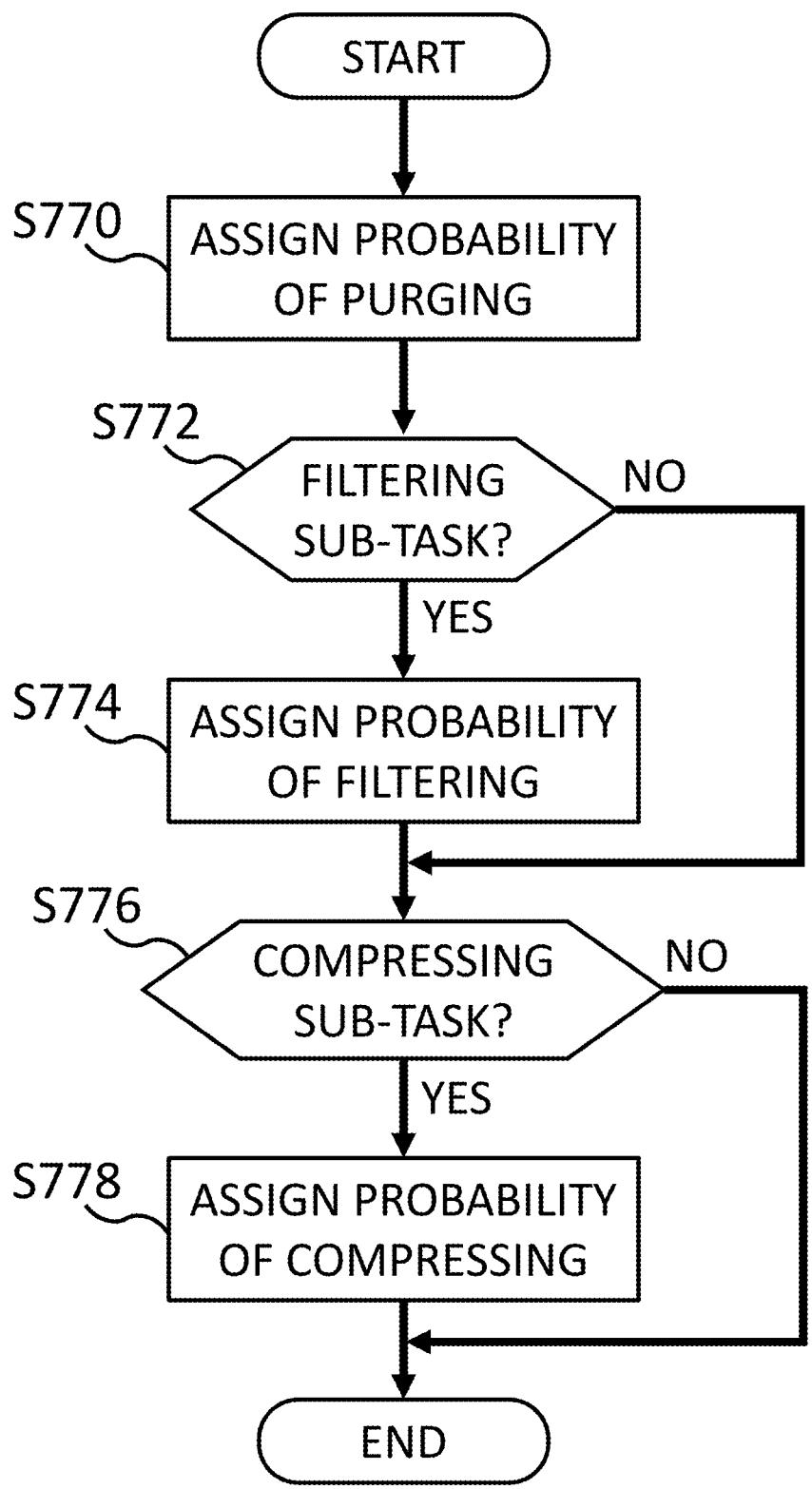
FIG. 7 is an operational flow for assigning a reduction probability in accordance with at least some embodiments of the subject disclosure.

FIG. 7 is an operational flow for assigning a reduction probability in accordance with at least some embodiments of the subject disclosure. The operational flow provides a method of assigning a reduction probability. In at least some embodiments, the method is performed by a mobile computing network, such as vehicle 140 shown in FIG. 1 or detecting vehicle system 410 shown in FIG. 4. In at least some embodiments, the method is performed by an assigning section of one or more processors of the mobile computing network collectively including sections for performing certain operations, such as ECU 420 shown in FIG. 4.

At S770, the assigning section assigns a probability of purging. In at least some embodiments, the assigning section assigns a first instance of captured target content a probability of purging based on the retention policy. In at least some embodiments, the probability of purging is inversely related to the priority value. In at least some embodiments, the probability of purging is a function of age and priority value. In at least some embodiments, the priority value is based on a retention policy, such as the retention policy received at S550 of FIG. 5.

At S772, the assigning section determines whether a filtering sub-task exists. In at least some embodiments, the assigning section receives, from the server, a filtering sub-task programmed to filter instances of captured target content, the filtering sub-task programmed to be executed by the mobile computing network. If the assigning section determines that a filtering sub-task exists, then the operational flow proceeds to filtering probability assignment at S774. If the assigning section determines that a filtering sub-task does not exist, then the operational flow proceeds to compressing sub-task determination at S776.

At S774, the assigning section assigns a probability of filtering. In at least some embodiments, the assigning section assigns a first instance of captured target content a probability of filtering based on the retention policy. In at least some embodiments, the probability of filtering is greater than the probability of purging, so that data is preserved when reducing storage consumption. In at least some embodiments, the assigning section reduces the probability of purging in response to determining that a filtering sub-task exists.

At S776, the assigning section determines whether a compressing sub-task exists. In at least some embodiments, the assigning section receives, from the server, a compressing sub-task programmed to compress instances of captured target content, the compressing sub-task programmed to be executed by the mobile computing network. If the assigning section determines that a compressing sub-task exists, then the operational flow proceeds to compressing probability assignment at S774. If the assigning section determines that a compressing sub-task does not exist, then the operational flow ends.

At S778, the assigning section assigns a probability of compressing. In at least some embodiments, the assigning section assigns a first instance of captured target content a probability of compressing based on the retention policy. In at least some embodiments, the probability of compressing is greater than the probability of purging, so that data is preserved when reducing storage consumption. In at least some embodiments, the assigning section reduces the probability of purging in response to determining that a compressing sub-task exists. In at least some embodiments, the assigning section further reduces the probability of purging in response to determining that a compressing sub-task and a filtering sub-task exist.

Figure 8:
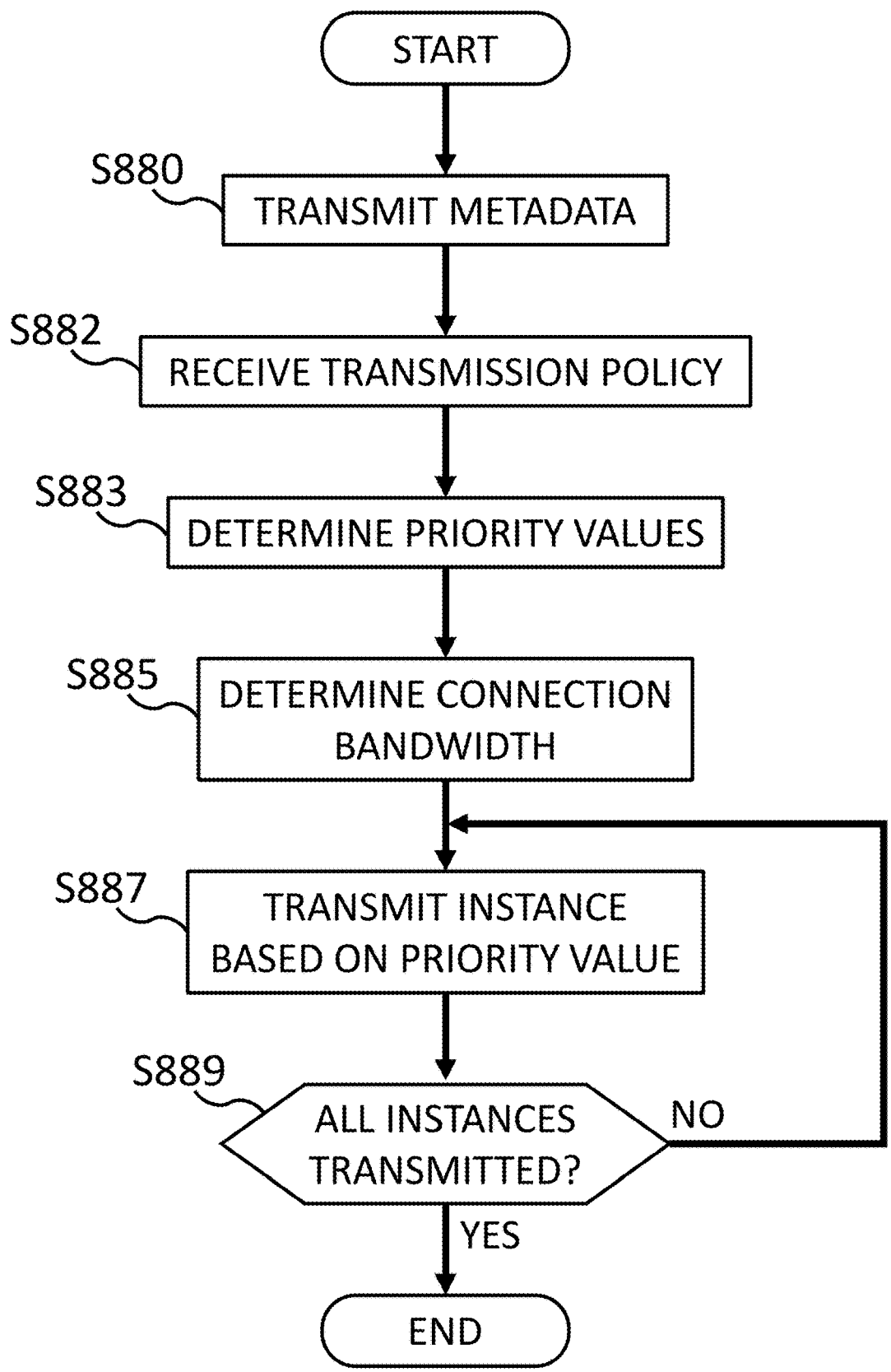
FIG. 8 is an operational flow for transmitting captured content in accordance with at least some embodiments of the subject disclosure.

FIG. 8 is an operational flow for transmitting captured content in accordance with at least some embodiments of the subject disclosure. The operational flow provides a method of transmitting captured content. In at least some embodiments, the method is performed by a mobile computing network, such as vehicle 140 shown in FIG. 1 or detecting vehicle system 410 shown in FIG. 4. In at least some embodiments, the method is performed by a transmitting section of one or more processors of the mobile computing network collectively including sections for performing certain operations, such as ECU 420 shown in FIG. 4.

At S880, the transmitting section transmits metadata of captured content. In at least some embodiments, the transmitting section transmits, in response to connecting to a wide area network, a metadata of each instance of captured target content. In at least some embodiments, the metadata provides descriptions or keywords explaining the respective instance of captured target content.

At S882, the transmitting section receives a content transmission policy. In at least some embodiments, the transmitting section receives, from the server in response to transmitting the metadata of each instance of captured target content, a transmission policy defining a transmission priority value corresponding to the first instance of captured target content. In at least some embodiments, the transmission priority value is based on a transmission priority function of the content transmission policy.

At S883, the transmitting section determines priority values based on the content transmission policy. In at least some embodiments, the transmitting section reads the transmission priority value expressly stated in the content transmission policy. In at least some embodiments, the transmitting section derives the transmission priority value from a transmission priority function of the transmission policy. In at least some embodiments, the transmission priority function is based on one or more of a size of the instance, an age of the instance, and the bandwidth of the connection to the server.

At S885, the transmitting section determines the bandwidth of the network connection. In at least some embodiments, the transmitting section determining, in response to connecting to the wide area network before transmitting the first instance, a bandwidth of a connection to the server. In at least some embodiments, the transmitting section determines the bandwidth before determining the priority values, such as where the transmission priority function depends on the bandwidth. In at least some embodiments, the transmitting section determines the bandwidth at regular intervals during transmission of the captured content, such as where the connection bandwidth is irregular, causing priority values to change according to the transmission priority function.

At S887, the transmitting section transmits an instance of captured content based on priority value. In at least some embodiments, the transmitting section transmits the first instance of captured target content among each instance of captured target content in an order based on the transmission priority value. As iterations of the instance transmission operation at S887 proceed, the transmitting section transmits each instance of captured content to the server. In at least some embodiments, the transmitting section refers to the transmission priority values determined at S883, or redetermined in response to changes in bandwidth, before transmitting each instance of captured content.

At S889, the transmitting section determines whether all instances of captured content have been transmitted. In at least some embodiments, the transmitting section determines whether all instances that were captured and remain in storage have been transmitted. In at least some embodiments, the transmitting section determines whether all instances that are requested by the server have been transmitted. If the transmitting section determines that untransmitted instances of captured content remain, then the operational flow returns to the instance transmission operation at S887. If the transmitting section determines that all instances of captured content have been transmitted, then the operational flow ends.

Figure 9:
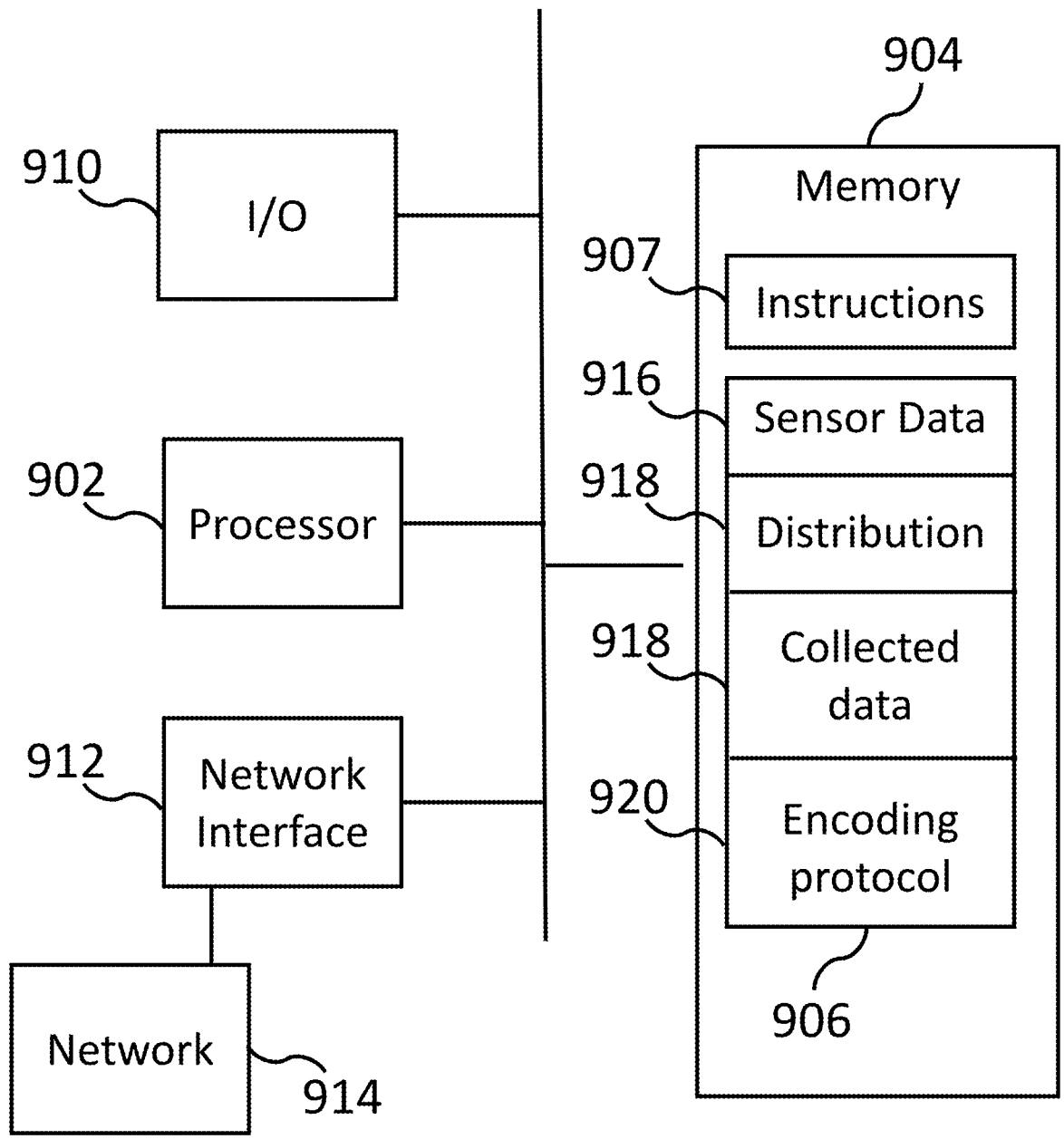
FIG. 9 is a diagram of a hardware configuration for mobile computing network content query and capture in accordance with at least some embodiments of the subject disclosure.

FIG. 9 is a diagram of a system 900 for implementing a request retrieval system in accordance with some embodiments. System 900 includes a hardware processor 902 and a non-transitory, computer readable storage medium 904 encoded with, i.e., storing, the computer program code 906, i.e., a set of executable instructions. Computer readable storage medium 904 is also encoded with instructions 907 for interfacing with external devices. The processor 902 is electrically coupled to the computer readable storage medium 904 via a bus 908. The processor 902 is also electrically coupled to an I/O interface 910 by bus 908. A network interface 912 is also electrically connected to the processor 902 via bus 908. Network interface 912 is connected to a network 914, so that processor 902 and computer readable storage medium 904 are capable of connecting to external elements via network 914. The processor 902 is configured to execute the computer program code 906 encoded in the computer readable storage medium 904 in order to cause system 900 to be usable for performing a portion or all of the operations as described in ODDR system 100 (FIG. 1), ODDR system 400 (FIG. 4) or method 600 (FIG. 6).

In some embodiments, the processor 902 is a central processing unit (CPU), a multi-processor, a distributed processing system, an application specific integrated circuit (ASIC), and/or a suitable processing unit.

In some embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 904 includes a compact disk-read only memory (CD-ROM), a compact disk-read/write (CD-R/W), and/or a digital video disc (DVD).

In some embodiments, the storage medium 904 stores the computer program code 906 configured to cause system 900 to perform a portion or all of the operations as described in ODDR system 100 (FIG. 1), ODDR system 400 (FIG. 4) or method 600 (FIG. 6). In some embodiments, the storage medium 904 also stores information needed for performing a portion or all of the operations as described in ODDR system 100 (FIG. 1), ODDR system 400 (FIG. 4) or method 600 (FIG. 6) as well as information generated during performing a portion or all of the operations as described in ODDR system 100 (FIG. 1), ODDR system 400 (FIG. 4) or method 600 (FIG. 6), such as a priority level parameter 916, a query ID parameter 918, a query status parameter 920, a query data parameter 922 and/or a set of executable instructions to perform a portion or all of the operations as described in ODDR system 100 (FIG. 1), ODDR system 400 (FIG. 4) or method 600 (FIG. 6).

In some embodiments, the storage medium 904 stores instructions 907 for interfacing with manufacturing machines. The instructions 907 enable processor 902 to generate manufacturing instructions readable by the manufacturing machines to effectively implement method 400 during a manufacturing process.

System 900 includes I/O interface 910. I/O interface 910 is coupled to external circuitry. In some embodiments, I/O interface 910 includes a keyboard, keypad, mouse, trackball, trackpad, and/or cursor direction keys for communicating information and commands to processor 902.

System 900 also includes network interface 912 coupled to the processor 902. Network interface 912 allows system 900 to communicate with network 914, to which one or more other computer systems are connected. Network interface 912 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in ODDR system 100 (FIG. 1), ODDR system 400 (FIG. 4) or method 600 (FIG. 6) is implemented in two or more systems 900, and information such as priority level, query ID, query status and query data are exchanged between different systems 900 via network 914.

In at least some embodiments, mobile computing network queried content capture is performed by receiving, from a server, a task executable by a mobile computing network, and a retention policy, executing the task using the mobile computing network to capture target content, assigning, to a first instance of captured target content, a probability of reducing based on the retention policy, reducing, in response to an amount of available storage becoming equal to or lower than a threshold amount, at least one of the first instance and a portion of other stored data based on the probability of reducing, and transmitting, in response to connecting to a wide area network, each instance of captured target content.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
receiving, from a server, a task executable by a mobile computing network, and a retention policy,
executing the task using the mobile computing network to capture target content,
assigning, to a first instance of captured target content, a probability of being determined as a target for reducing based on the retention policy,
determining, in response to an amount of available storage of a memory device within the mobile computing network becoming equal to or lower than a threshold amount, to reduce consumed storage of the memory device by either the first instance or a portion of other stored data based on the probability of being determined as a target for reducing assigned to the first instance,
reducing the determined either of the first instance or the portion of other stored data, and
transmitting, in response to connecting to a wide area network, each instance of captured target content.

2. The method of claim 1, wherein the assigning includes assigning the first instance of captured target content a probability of being determined as a target for purging based on the retention policy.

3. The method of claim 2, wherein the reducing includes purging the determined either of the first instance or the portion of other stored data.

4. The method of claim 1, wherein the assigning includes assigning the first instance of captured target content a probability of being determined as a target for filtering based on the retention policy.

5. The method of claim 4, further comprising:
receiving, from the server, a filtering sub-task programmed to filter the first instance of captured target content, the filtering sub-task programmed to be executed by the mobile computing network.

6. The method of claim 5, wherein the reducing includes filtering the determined either of the first instance or the portion of other stored data using the filtering sub-task.

7. The method of claim 1, wherein the assigning includes assigning the first instance of captured target content a probability of being determined as a target for compressing based on the retention policy.

8. The method of claim 7, further comprising:
receiving, from the server, a compression sub-task programmed to compress the first instance of captured target content, the compression sub-task programmed to be executed by the mobile computing network.

9. The method of claim 8, wherein the reducing includes compressing the determined either of the first instance or the portion of other stored data using the compression sub-task.

10. The method of claim 1, wherein the executing includes
executing the task within a sandbox of limited computational resources.

11. The method of claim 1, wherein the executing includes closing the task in response to receiving an instruction to execute a priority task.

12. The method of claim 1, wherein the executing includes
causing an available controller to execute the task in response to detecting that a resource usage of the available controller is less than a threshold amount.

13. The method of claim 1, wherein the transmitting includes
transmitting, in response to connecting to a wide area network, a metadata of each instance of captured target content.

14. The method of claim 13, wherein the transmitting includes
receiving, from the server in response to transmitting the metadata of each instance of captured target content, a transmission policy defining a transmission priority value corresponding to the first instance of captured target content.

15. The method of claim 14, wherein the transmitting of each instance of the captured target content includes
transmitting the first instance of captured target content among each instance of captured target content in an order based on the transmission priority value.

16. The method of claim 15, wherein the transmitting of each instance of the captured target content includes
determining, in response to connecting to the wide area network before transmitting the first instance, a bandwidth of a connection to the server.

17. The method of claim 14, wherein the transmitting of each instance of the captured target content includes
deriving the transmission priority value from a transmission priority function of the transmission policy.

18. The method of claim 17, wherein
the transmission priority function is based on one or more of a size of the first instance, an age of the first instance, and the bandwidth of the connection to the server.

19. A non-transitory computer-readable storage medium including instructions executable by a processor to cause the processor to perform operations comprising:
receiving, from a server, a task executable by a mobile computing network, and a retention policy,
executing the task using the mobile computing network to capture a target content,
assigning, to a first instance of captured target content, a probability of being determined as a target for reducing based on the retention policy,
determining, in response to an amount of available storage of a memory device within the mobile computing network becoming equal to or lower than a threshold amount, to reduce consumed storage of the memory device by either the first instance or a portion of other stored data based on the probability of being determined as a target for reducing assigned to the first instance,
reducing the determined either of the first instance or the portion of other stored data, and
transmitting, in response to connecting to a wide area network, each instance of captured target content.

20. An apparatus comprising:
a controller including circuitry configured to perform operations including
receiving, from a server, a task executable by a mobile computing network, and a retention policy,
executing the task using the mobile computing network to capture a target content,
assigning, to a first instance of captured target content, a probability of being determined as a target for reducing based on the retention policy,
determining, in response to an amount of available storage of a memory device within the mobile computing network becoming equal to or lower than a threshold amount, to reduce consumed storage of the memory device by either the first instance or a portion of other stored data based on the probability of being determined as a target for reducing assigned to the first instance,
reducing the determined either of the first instance or the portion of other stored data, and
transmitting, in response to connecting to a wide area network, each instance of captured target content.

* * * * *